UNITED STATES PATENT OFFICE.

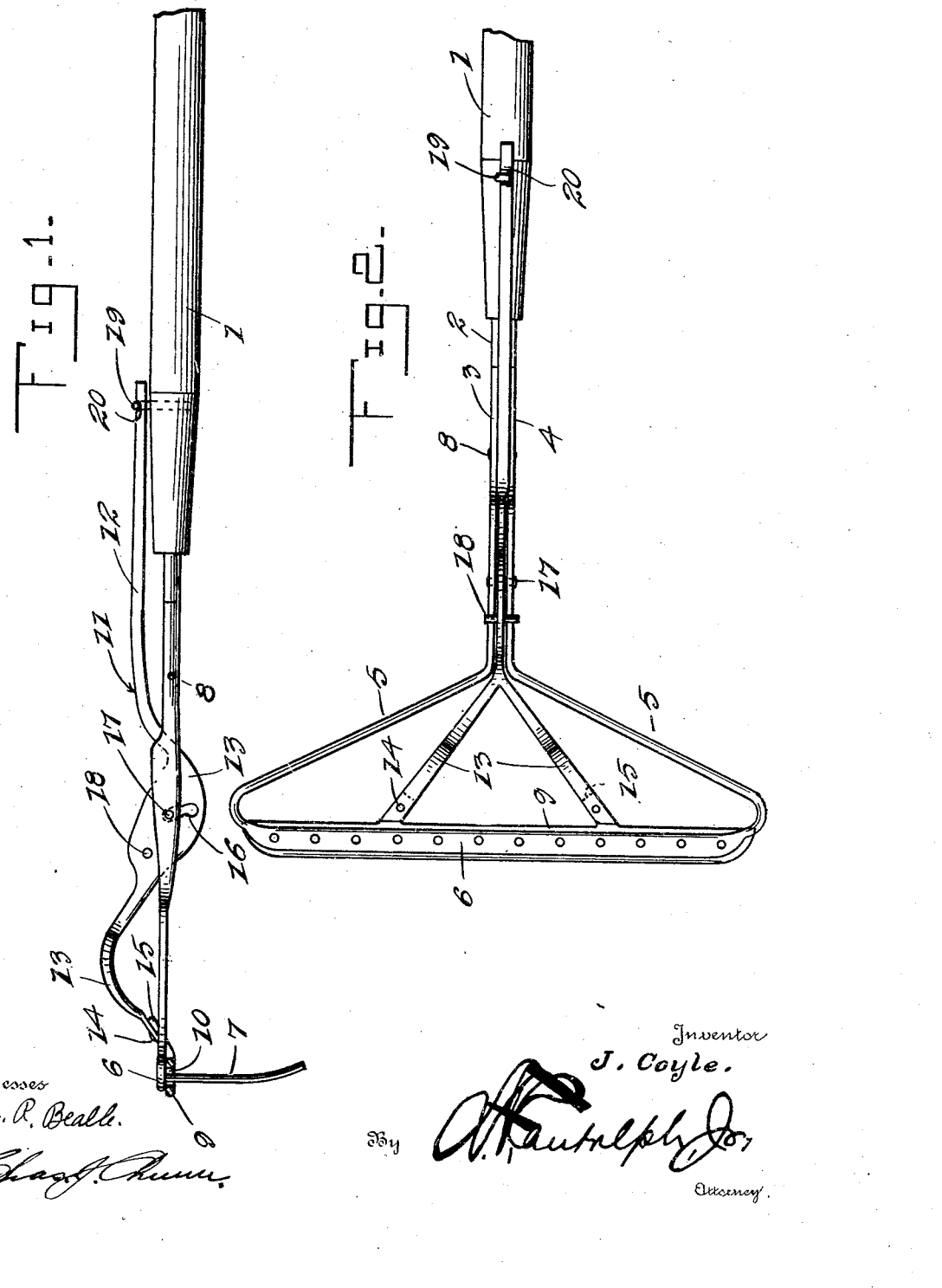

JAMES COYLE, OF TREMONT, PENNSYLVANIA.

RAKE-CLEANER.

1,111,297.  Specification of Letters Patent.  Patented Sept. 22, 1914.

Application filed May 20, 1914. Serial No. 839,846.

*To all whom it may concern:*

Be it known that I, JAMES COYLE, a citizen of the United States, residing at Tremont, in the county of Schuykill and State of Pennsylvania, have invented certain new and useful Improvements in Rake-Cleaners; and I do hereby declare the following to be a full, clear, and exact description of the invention, such as will enable others skilled in the art to which it appertains to make and use the same.

My invention relates to improvements in rakes and more particularly to cleaning means therefor that is simple and effective and may be readily attached to a rake and operated in an easy and expeditious manner to strip the teeth of the rake of leaves, trash and other foreign matter.

An important object of my invention is to provide cleaning means which comprises a stripping bar and a pivoted operating rod therefor, said rod being pivoted in a novel manner and provided with stop means to limit its movement in one direction so as to prevent moving of the stripping bar out of operative relation with the teeth.

Another object of importance is to provide means for holding the operating bar in normal position so that the stripping bar is in an out of the way position and will not interfere with the using of the rake in the usual manner.

Another object is to provide means of the character described that is simple as to construction, reliable and efficient in operation, and inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of my improved rake cleaner showing the same in assembled position, and Fig. 2 is a top plan view.

Referring to the drawings by characters of reference, the numeral 1 designates a rake handle that is provided at one end with an extension 2, that is reduced adjacent its end and has secured upon the reduced portion, rake head securing and supporting bars 3 and 4 that extend parallel outwardly for a distance equivalent to approximately half their length and then diverge to provide angularly disposed portions 5. The angular disposed portions 5 are formed integral or otherwise suitably secured with the rake head 6. The rake head 6 is provided with the usual spaced teeth 7. Fastening means of any suitable character 8 serve to secure the bars 3 and 4 to the extension 2.

My improved cleaning means comprises an elongated stripping bar 9 that is provided with a plurality of spaced teeth receiving apertures. The bar 9 is slidable upon the teeth 10 and arranged to engage the under face of the rake head 6, when in inoperative position.

An operating rod designated 11 as an entirety is arranged to coact with the stripping bar 9 and comprises a relatively straight handle portion 12, an enlarged and relatively flattened portion 13 formed intermediate its ends and downwardly curved divergent arms that are approximately semi-circular and have their lower ends secured by suitable fastening means 14 to rearwardly and upwardly extending lugs 15 formed on opposite sides of the center of the stripping bar 9. An approximately vertical and slightly curved slot 16 is formed in the central part of the enlarged flattened portion 13 and slidably receives a pivot pin 17 that is inserted transversely through the bars 3 and 4. The bars 3 and 4 are slightly spaced from each other adjacent the outer ends of the parallel portions thereof and have the portion 13 mounted therebetween.

A transverse stop pin 18 mounted adjacent the upper edge of the enlarged flattened portion 13 and arranged forwardly of the pivot 17 is designed to engage the bars 3 and 4 and limit the downward movement of the stripping bar 9. As a means for holding the bar 12 in inoperative position as shown in Fig. 1 I provide a hook 19 carried by the handle 1 and arranged to fit within a transverse groove 20 formed in the outer end of the handle portion 12. The hook 19 is approximately L-shaped and the horizontal portion thereof is arranged in spaced relation to the handle 1 sufficiently to permit the fastening and unfastening of the handle.

In operation the handle portion 12 is unhooked by depressing the handle and moving slightly to one side of the hook. The handle portion 12 is then lifted upwardly or moved away from the handle 1 causing the arms 13 to move inwardly or downwardly and thus pushing the bar 9 downwardly on the teeth 7. The stripping bar 9 in being moved downwardly relative the teeth or outwardly toward the end thereof serves to strip the teeth of all foreign matter. The transverse stop pin 18 in projecting from the sides of the flattened portion 13 and being arranged forwardly and above the pivot 17 serves to limit the downward movement of the stripping bar when engaging the bars 3, and 4. The slightly curved slot 16 enables an easy upward and downward movement of the operating rod 11.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. The combination with a rake comprising a handle, a head and teeth on the head of a stripping bar having a plurality of teeth receiving apertures therein slidable on said teeth, an operating rod comprising a relatively straight handle portion, a flattened enlarged portion centrally of the ends of the rod and having a curved slot therein and divergent curved and downwardly extended arms at the end of the rod opposite to the handle, said arms being connected with the stripping bar, a pin pivotally connecting the bar with the handle being slidable within the slot in the flattened portion and a transverse pin projecting from either side of the flattened portion forwardly of and above the pivot to engage the handle of the rake to limit the downward movement of the stripping bar.

2. A rake cleaner comprising a stripping bar having a plurality of teeth receiving apertures therein, an operating rod for the bar comprising a relatively straight handle portion at one end, a flattened enlarged portion intermediate its ends and divergent curved and downwardly extending arm portions at the other end, said arm portions being operatively connected with the stripping bar, said flattened portion being pivoted to a rake handle and provided with a curved slot to receive the pivot pin and means carried by the flattened portion to engage the rake handle to limit the downward movement of the stripping bar.

3. A rake cleaner comprising a stripping bar having a plurality of teeth receiving apertures therein, an operating rod for the bar comprising a relatively straight handle portion at one end, a flattened enlarged portion intermediate its ends and divergent curved and downwardly extending arm portions at the other end, said arm portions being operatively connected with the stripping bar, said flattened portion being pivoted to a rake handle and provided with a curved slot to receive the pivot pin, means carried by the flattened portion to engage the rake handle to limit the downward movement of the stripping bar, and means to hold the stripping bar in normal position in engagement with the head of the rake comprising a hook carried by the rake handle arranged to fit within a transverse groove adjacent the outer end of the handle portion of the operating rod.

In testimony whereof I affix my signature in presence of two witnesses.

JAMES COYLE.

Witnesses:
W. H. REINBOLD,
SARAH M. REINBOLD.